April 14, 1959
C. W. COCHRAN
2,881,493
FASTENING DEVICE
Filed July 13, 1955
2 Sheets-Sheet 1
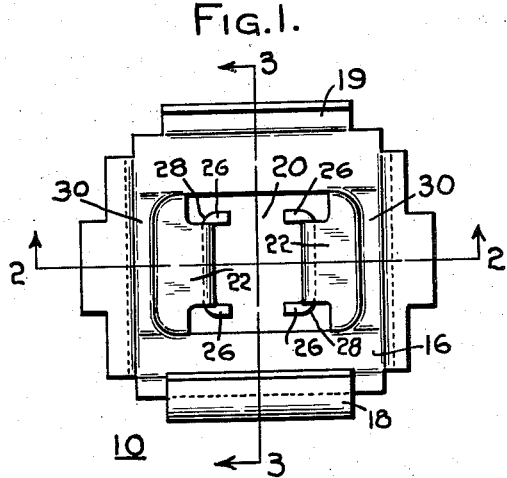
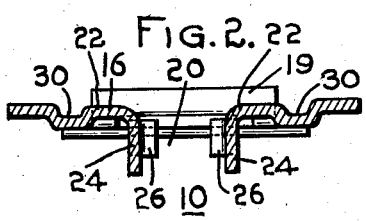
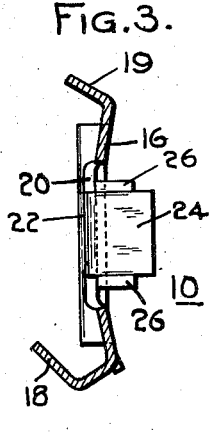
INVENTOR:
CLARENCE W. COCHRAN,
BY Robert E Ross
ATTORNEY.

April 14, 1959 C. W. COCHRAN 2,881,493
FASTENING DEVICE
Filed July 13, 1955 2 Sheets-Sheet 2
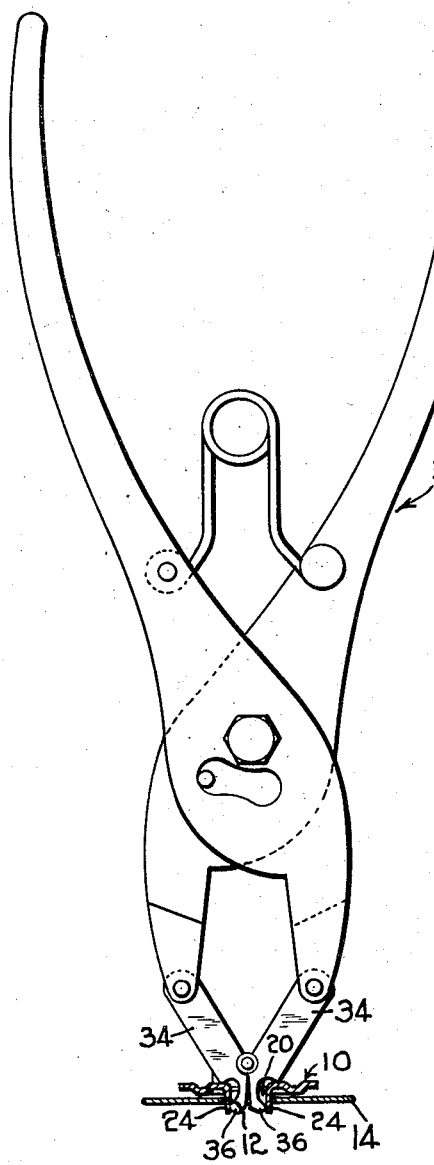
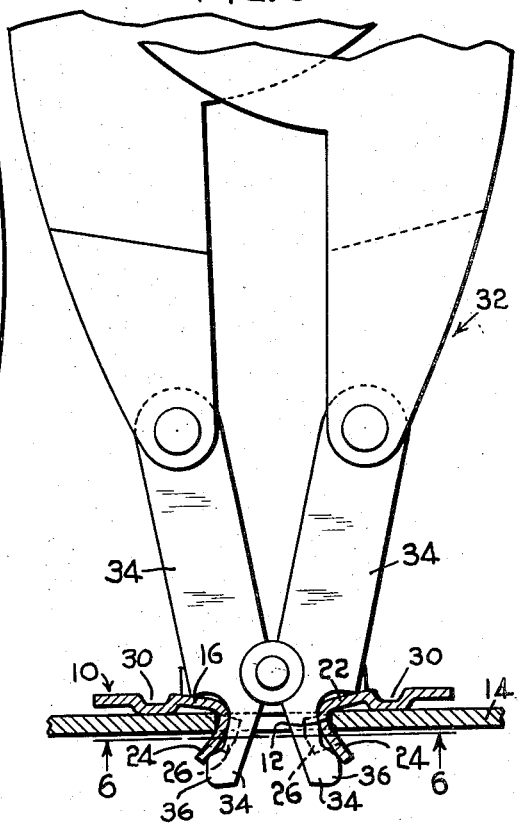
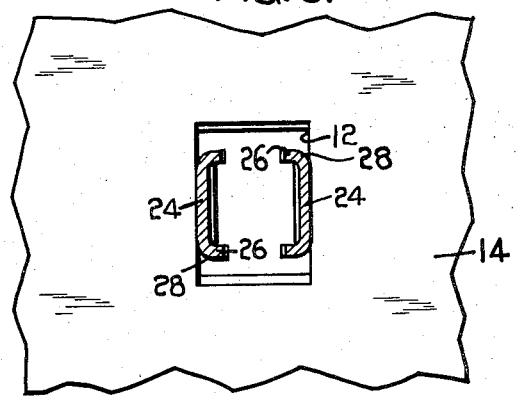
INVENTOR:
CLARENCE W. COCHRAN,
BY Robert E Ross
ATTORNEY.

2,881,493

FASTENING DEVICE

Clarence W. Cochran, Belmont, Mass., assignor to United-Carr Fastener Corporation, Boston, Mass., a corporation of Delaware Application July 13, 1955, Serial No. 521,822

1 Claim. (Cl. 24—73)

This invention relates generally to fastening devices and has particular reference to a fastener for attaching a trim molding or the like to a panel.

In the construction of automobiles, appliances, and the like, channeled decorative molding is required to be attached to the exterior surface of certain panels, and in many cases it is essential that the position of the molding be adjustable after assembly so that the end of the molding on one panel will be in alignment with the end of the molding on an adjacent panel. For example, the door molding must be aligned at each end to conform to the position of the body molding on the panel adjacent the door.

The object of this invention is to provide a fastening device for attaching an article to a panel which has improved means for engagement into a panel opening.

Another object of the invention is to provide a fastening device for attaching an article to a panel which is adapted for lateral adjustment without impairing the strength of the attachment.

Another object of the invention is to provide a molding fastener having a pair of spaced depending arms deformably outwardly for engagement in a panel opening which has means thereon controlling the point of deformation and facilitating lateral adjustment.

Other objects of the invention will, in part, be obvious, and will, in part, appear hereinafter.

In the drawing:

Fig. 1 is a top plan view of a fastening device embodying the features of the invention;

Fig. 2 is a view in section taken on line 2—2 of Fig. 1;

Fig. 3 is a view in section taken on line 3—3 of Fig. 1;

Fig. 4 is a view in side elevation, partly in section, illustrating the fastener and an assembly tool in position for attachment to a panel opening;

Fig. 5 is an enlarged view similar to Fig. 4 showing the fastener after atachment; and Fig. 6 is a view in section taken on line 6—6 of Fig. 5.

Referring to the drawing, there is illustrated a fastening device 10 which is adapted for assembly into an opening 12 in a panel 14 to enable a trim molding or the like (not shown) to be attached thereto.

The fastener 10 comprises a base 16 having means such as flanges 18 and 19 at opposite edges for receiving a channeled molding, a central aperture 20, and a pair of attaching legs extending downwardly from the edges of the panel at opposite sides of the aperture. In the preferred embodiment the legs each have a laterally extending portion 22 extending into the central aperture 20 and a downwardly extending portion 24 extending substantially perpendicular to the plane of the base for entering the panel opening. The portion 24 of each leg is provided with a pair of extensions 26 on the side edges thereof, and said extensions are bent out of the plane of the leg to extend generally toward the opposite leg so that the side edges of the legs are provided with rounded surfaces 28. In the illustrated embodiment, embossments 30 are provided on the base which project downwardly on the same side of the base as the arms so that when the fastener is placed on a panel in position for attachment, the laterally extending portions 22 of the legs are spaced upwardly from the panel for a purpose to appear hereinafter.

The fastener is conveniently attached by means of a tool 32, which is provided with a pair of spreadable jaws 34 having outwardly facing shoulders 36 on the ends. With the fastener disposed on the panel so that the portions 24 project through the panel opening 12, the jaws 34 of the tool 32 are inserted between the legs. As the jaws 34 are spread, the shoulders 36 contact the ends of the legs and force them outwardly. Due to the stiffening action of the side extensions 26, the outward forces tend to draw the legs downwardly into the opening, resulting in downward deformation of the lateral portion 22. When the tool is released, the legs remain in secure engagement with the opposite edges of the opening.

After attachment, the fastener may be forced sideways in the panel opening for proper alignment without impairing the strength of the attachment by reason of the rounded edges 28, which prevent the legs from digging into the edge of the sheet metal panel.

The fastener 10 may also be assembled into a round panel opening, in which case, the construction of the legs permits rotational adjustment without damaging the strength of the attachment.

Although in the illustrated embodiment the fastener is designed to secure trim molding to the panel, it will be evident that the flanges 18 and 19 may be replaced by means for engaging tubing, wiring, or the like.

Since certain other obvious modifications may be made in this device without departing from the scope of the invention, it is intended that all matter contained herein be interpreted in an illustrative and not in a limiting sense.

I claim:

An adjustable tool-attached fastening device for attaching an article to a support, said fastening device comprising a base having an aperture therein, a pair of opposed deformable arm portions, each extending below the plane of said base and from opposed peripheral edges of the aperture downwardly in spaced substantially parallel relationship to one another and at substantially right angles to the plane of the base for entering a support opening, each arm portion having a pair of opposed extensions extending downwardly from just adjacent the plane of the base to short of its free end on each side edge thereof to stiffen the arm, each pair of extensions lying outside the side edges of the respective arm portion at substantially right angles thereto and extending forwardly beyond its respective arm portion in the direction of the other arm portion whereby, when said arms are bent outwardly by force applied to their free ends, the major portion of the deformation of said arms occurs closely adjacent the base thereby resulting in only smooth surfaces being forced into contact with a support.

References Cited in the file of this patent

UNITED STATES PATENTS

| 2,187,321 | Johnson | Jan. 16, 1940 |
| 2,588,251 | Kost | Mar. 4, 1952 |
| 2,653,687 | Churchill | Sept. 29, 1953 |
| 2,685,721 | Eves | Aug. 10, 1954 |

FOREIGN PATENTS

| 667,946 | Great Britain | Mar. 12, 1952 |
| 678,603 | Great Britain | Sept. 3, 1952 |